Sept. 20, 1971    J. F. JORDAN    3,606,363
INTERNALLY THREADED SEAL
Filed Dec. 23, 1969

INVENTOR
James F. Jordan

United States Patent Office 3,606,363
Patented Sept. 20, 1971

3,606,363
INTERNALLY THREADED SEAL
James F. Jordan, Orchard Park, N.Y., assignor to
Bethlehem Steel Corporation
Filed Dec. 23, 1969, Ser. No. 887,604
Int. Cl. F16j 15/16
U.S. Cl. 277—237                    3 Claims

ABSTRACT OF THE DISCLOSURE

An internally threaded seal for sealing between a rotating threaded shaft and a stationary body containing a threaded bore. The seal is threadably connected to the shaft and fastened to the stationary body. The seal performs two functions: (a) prevents contamination of lubricated moving parts contained within the stationary body, and (b) retains lubricant within the stationary body.

BACKGROUND OF THE INVENTION

This invention relates to an article that forms a seal when it is used in combination with a rotating threaded shaft and a stationary body containing a threaded bore. More particularly this invention relates to an article that forms a seal at the point where the threaded shaft protrudes beyond the stationary body thereby preventing entry of contaminants into the stationary body and also retaining lubrication within the stationary body.

Large industrial machinery such as continuous hot strip mills and multi-stand tandem cold reducing mills, common in the steel industry, contain numerous lubricated threaded shafts. The typical four-high finishing stands in the rolling train of a continuous hot strip mill contain two mill housings for each stand of rolls. The mill housings are large annealed cast steel structures. These structures contain pinion stand gears, a screwdown mechanism and power transmission elements. The mill housing is lubricated automatically by a recirculating oil system.

A screwdown shaft is an element of the screwdown mechanism. The shaft is mounted vertically in the mill housing with the lower end protruding therefrom and contacting a back-up roll bearing box.

The screwdown shafts on continuous hot strip mills, particularly those equipped with automatic gauge control compensators, are in constant helical motion. This constant vertical movement within and out of the mill housing prevents two problems:

(a) loss of lubricant: lubricating oil contained within the mill housing is carried away on the threads of the screwdown shaft;
(b) contamination of moving parts: during operation the screwdown shaft picks up contaminants from the environment, scale and mill dirt, and carries them up into the mill housing contaminating the parts contained therein.

It has been calculated that the loss of lubricant from a hot mill's finishing stands' recirculating oil system amounts to 250 gallons per day. A secondary effect created by this loss of lubricating oil is an unsafe and hazardous work area.

Prior to this invention there was no effective technique for conserving lubricant and preventing contamination. Felt pads were placed adjacent the stationary body to absorb the dripping oil. However this technique was not effective because lubricant was not saved and the pads soon became saturated thereby necessitating periodic replacement. Furthermore in a high speed operation such as a continuous hot strip mill it would be costly and impractical to periodically stop production in order to replace oil saturated felt pads with new unsaturated ones.

SUMMARY OF THE INVENTION

One of the objects of this invention is to provide an internally threaded seal that, when used in combination with a rotating threaded shaft and a stationary member, eliminates the loss of lubricating oil.

A further object of this invention is to provide an internally threaded seal that will prevent environmental contaminants from entering a lubricated mill housing.

Still a further object of this invention is to provide an internally threaded seal that has a degree of flexibility as the threaded shaft passes through the seal.

Still a further object of this invention is to provide a seal that will prevent lubricating oil from creating an unsafe work environment.

The objects of this invention are achieved by fastening an internally threaded seal assembly to the stationary member. The seal assembly consists of a molded, flexible internally threaded body and an annular steel keeper plate. The internally threaded body threadably engages the shaft and contacts the stationary member. The annular steel keeper plate is then placed over the threaded body and fastened to the stationary member.

These and other objects will be apparent from the disclosure which follows.

DESCRIPTION OF THE PREFERRED EMBODIMENT

Figure 1:
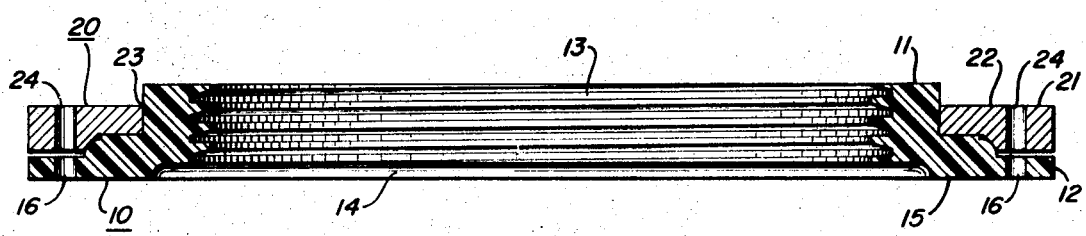
FIG. 1 is a cross-sectional view of the internally threaded seal and the keeper plate.

Shown in FIG. 1 is a seal 10 and a keeper plate 20.

Figure 2:
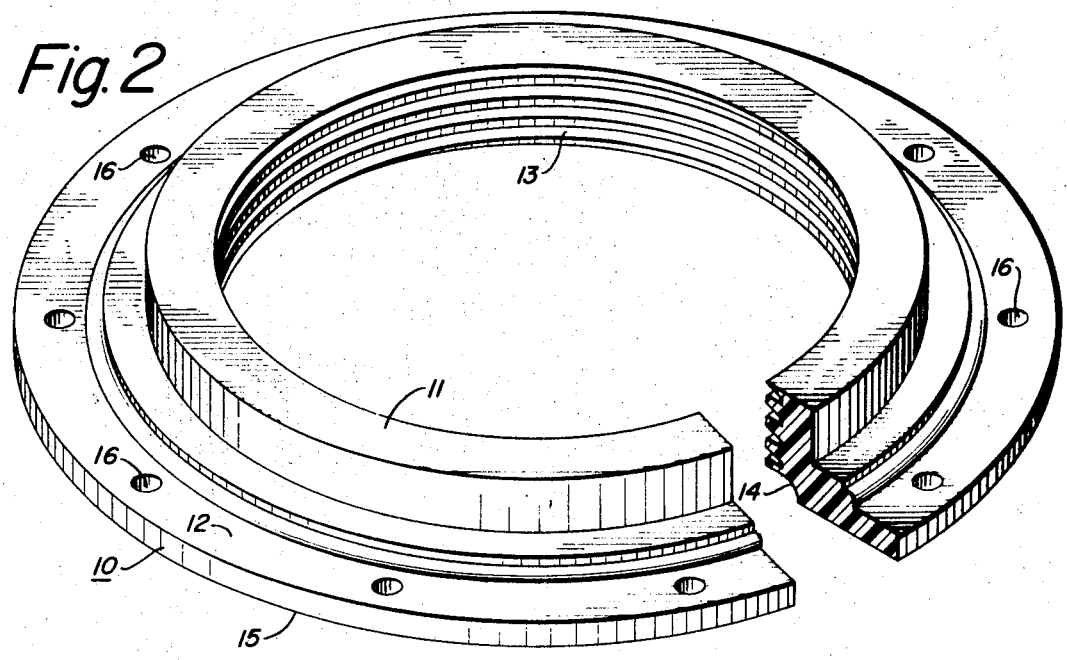
FIG. 2 is an isometric view of the internally threaded seal with a portion cut away illustrating the internal annular recess.

As shown in FIGS. 1 and 2, seal 10 consists of annular body portion 11 and a flange portion 12 extending radially from one end of the body portion. Body portion 11 contains an internal threaded cavity 13. Flange portion 12 contains annular recess 14 which extends radially outwardly from internal threaded cavity 13. Spaced along the periphery of flange portion 12 are openings 16.

Annular recess 14 provides the seal with flexibility. This flexibility prevents damage to the molded threads of the seal as the shaft helically rotates therein. This recess also helps the seal maintain contact with the stationary body thereby preventing loss of lubricant.

Keeper plate 20 consists of annular body portion 21, flange portion 22 and central bore 23. Spaced along the periphery of body portion 21 are openings 24.

There are the same number of openings in the seal and the keeper plate. In addition they are equally spaced so that when fasteners 17 are inserted the seal assembly can be fastened to stationary member 40 as hereinafter described.

Figure 3:
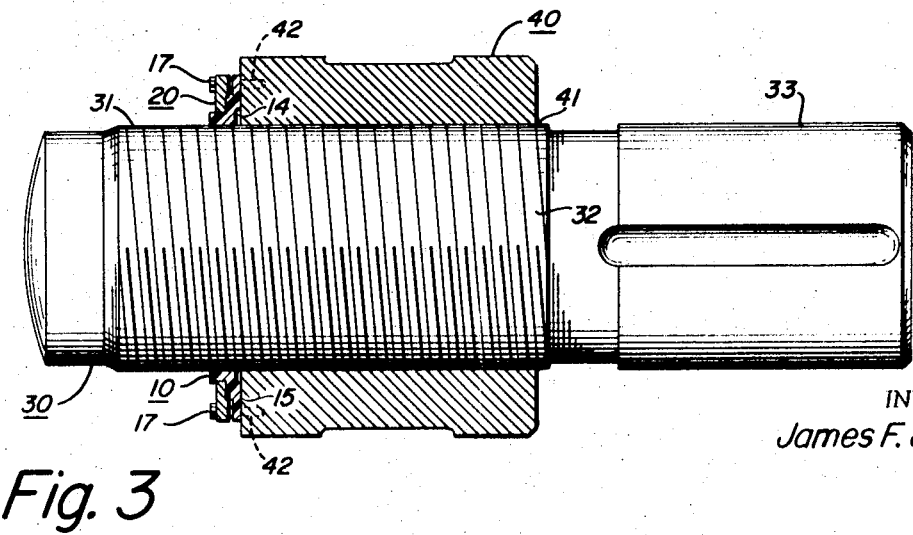
FIG. 3 is a side view of the seal assembly fastened to the stationary member.

FIG. 3 shows seal 10 in threadable engagement with shaft 30 and face 15 of flange 12 contacting stationary member 40.

Shaft 30 is positioned in threadable engagement with threaded bore 41 of stationary member 40. Stationary member 40 is adapted to be placed in a mill housing (not shown) so that shaft 30 lies in a vertical plane. The lower portion 31 of the shaft projects beyond stationary member 40 while the upper portion 33 engages mill housing gearing (not shown).

After the seal engages the shaft and contacts the stationary body, keeper plate 20 is placed over the seal. Seal openings 16, keeper plate openings 24 and threaded bores 42 of stationary body 40 are aligned and threaded fasteners 17 are inserted thereby fastening the assembly to the stationary body.

Seal threads 13, shaft threads 32 and stationary housing threaded bore 41 have the same pitch enabling threadable engagement of the seal assembly, the shaft and the stationary member.

The present invention has been used in the following manner when loss of lubricating oil was encountered on the 18-inch diameter screwdown screws of a continuous hot strip mill. A seal 10 was made from polyurethane in a specially designed mold. After the polyurethane cured, the seal was ready for use. The dimensions and the thread design of the seal corresponded to the 18-inch diameter shaft.

The seal is now threadably connected to the shaft 30. It is placed onto the shaft and brought up tight against stationary body 40. The keeper plate 20, an annular steel body with a bore 23 slightly larger than annular body portion 11 of the seal is placed over the seal. The seal and the keeper plate contain 10 evenly spaced openings around their respective peripheries. These openings are aligned and steel bolts 17 are inserted and tightened, thereby fastening the assembly to the stationary body.

The assembled combination is now lifted by an overhead crane (not shown) and placed vertically in a hot mill finishing stand mill housing (not shown).

The vertical screwdown screw, containing the seal assembly, can now function without loss of lubricating oil or pick up of environmental contaminants.

It will be understood that modifications and variations may be effected without departing from the scope of the novel concepts of this invention.

I claim:
1. A seal for sealing between a rotating threaded shaft and a stationary member having a threaded bore which comprises:
   (a) an annular, internally threaded body adapted for threadable engagement with said shaft;
   (b) a flange extending radially from one end of said body; and
   (c) an annular recess in said flange extending radially outwardly from said internally threaded body portion.
2. A seal assembly, the combination comprising:
   (a) a stationary member, said member having a threaded bore;
   (b) a shaft positioned in threaded engagement with said bore and adapted to rotate therein and having one end thereof projecting beyond said member;
   (c) a seal, in contact with said member, said seal having:
      (1) an annular, internally threaded body in threaded body in threaded engagement with said shaft;
      (2) a flange extending radially from one end of said body;
      (3) an annular recess in said flange extending radially outwardly from said internally threaded body portion; and
   (d) an annular body having a centrally located bore, said bore being larger in diameter than said annular internally threaded body and adapted to receive means to secure said annular body and the flange to said stationary member.
3. A seal assembly as recited in claim 2 wherein the thread pitch of the threads of elements (a), (b) and (c) are the same.

References Cited
UNITED STATES PATENTS

| | | | |
|---|---|---|---|
| 2,199,647 | 5/1940 | Mueller et al. | 277—189 |
| 2,070,126 | 2/1937 | Heinze | 277—237 |
| 2,756,795 | 7/1956 | Clingman | 277—237 |
| 3,126,917 | 3/1964 | Hodgeman et al. | 277—237X |

ROBERT I. SMITH, Primary Examiner

U.S. Cl. X.R.

277—189; 285—355; 287—52.07